(12) United States Patent
Nishina

(10) Patent No.: US 7,296,823 B2
(45) Date of Patent: Nov. 20, 2007

(54) IGNITER ASSEMBLY, INFLATOR, AIRBAG DEVICE, AND SEAT BELT DEVICE

(75) Inventor: Takuma Nishina, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/371,923

(22) Filed: Mar. 10, 2006

(65) Prior Publication Data

US 2006/0207459 A1   Sep. 21, 2006

(30) Foreign Application Priority Data

Mar. 18, 2005   (JP) .............................. 2005-079672

(51) Int. Cl.
 *B60R 21/26* (2006.01)
 *C06D 5/00* (2006.01)
 *F42C 19/12* (2006.01)

(52) U.S. Cl. .................. 280/741; 102/530; 102/202.5; 102/202.12; 280/806

(58) Field of Classification Search ................ 102/530, 102/531, 202.5, 202.7, 202.12, 202.14; 280/736, 280/741, 806; 60/632
See application file for complete search history.

(56) References Cited

U.S. PATENT DOCUMENTS

| | | | | |
|---|---|---|---|---|
| 4,520,731 A | * | 6/1985 | Gotz et al. .................. | 102/527 |
| 5,350,194 A | * | 9/1994 | Fohl ............................. | 280/805 |
| 5,531,473 A | * | 7/1996 | Rink et al. ................... | 280/737 |
| 5,558,366 A | * | 9/1996 | Fogle et al. ................. | 280/736 |
| 6,508,175 B1 | * | 1/2003 | Avetisian ............... | 102/202.14 |
| 6,644,198 B1 | * | 11/2003 | Avetisian et al. ...... | 102/202.14 |
| 6,763,764 B2 | * | 7/2004 | Avetisian et al. ...... | 102/202.14 |
| 6,820,556 B1 | | 11/2004 | Oda | |
| 7,192,054 B2 | * | 3/2007 | Smith .......................... | 280/741 |
| 2002/0174792 A1 | * | 11/2002 | Kubozuka et al. ...... | 102/202.12 |
| 2004/0232679 A1 | * | 11/2004 | Kubo et al. ................. | 280/741 |
| 2004/0251667 A1 | | 12/2004 | Harada et al. | |

FOREIGN PATENT DOCUMENTS

EP          1 447 641 A1     8/2004

* cited by examiner

*Primary Examiner*—Eric Culbreth
*Assistant Examiner*—Joseph Rocca
(74) *Attorney, Agent, or Firm*—Manabu Kanesaka

(57) ABSTRACT

An igniter assembly includes an igniter, a substantially cylindrical collar for holding the igniter, and resin for joining the igniter to the collar. The collar has a cylindrical main body, a collar portion provided inward at the inner circumferential surface of the main body, and a cylindrical surrounding wall portion which extends from one end of the main body in the axial direction of the main body. A groove is formed in a radial surface of the collar portion at the side of the surrounding wall portion. The resin is filled between the igniter and the inner circumferential surface and the radial surface of the internal hole of the collar portion and the inside of the surrounding wall portion so as to fill in the groove. The collar is easily manufactured, and the igniter assembly prevents a gap from being generated due to shrinkage of resin.

11 Claims, 8 Drawing Sheets

IGNITER ASSEMBLY, INFLATOR, AIRBAG DEVICE, AND SEAT BELT DEVICE

BACKGROUND OF THE INVENTION AND RELATED ART STATEMENT

The present invention relates to an igniter assembly used in an inflator of an airbag device or a seat belt device, an inflator including the igniter assembly, and an airbag device and a seat belt device including the inflator.

In an igniter assembly assembled in an inflator of an airbag device, if an igniter is energized, high-temperature reaction gas is rapidly generated and a gas generating agent of the inflator starts to react with this reaction gas. Thus, the inflator generates a large amount of gas, and an airbag rapidly expands by this gas.

A conventional igniter assembly of an inflator will be described with reference to FIGS. 10(a)-10(c). FIG. 10(a) is a cross-sectional view taken along the axial direction of the igniter assembly, FIG. 10(b) is a cross-sectional view taken along the axial direction of a collar, and FIG. 10(c) is an enlarged cross-sectional view of the interface between the collar and a resin.

The igniter assembly 10A includes an igniter 20, a substantially cylindrical collar 30A for holding the igniter 20, and the resin 40 for joining the igniter 20 to the collar 30A. The igniter 20 has a head portion 21 containing a reaction agent and pins 22 and 23 protruded and extended from the head portion 21 as conducting terminals. The collar 30A has a cylindrical main body 31, a collar portion 32 provided inward at the inner circumferential surface of the main body 31, and a cylindrical surrounding wall portion 33 extended from one end of the shaft of the main body 31. A surface 32b of the collar portion 32 at the side of the surrounding wall portion 33 is a radial surface extended in a radiant direction perpendicular to the shaft of the main body 31.

The head portion 21 of the igniter 20 is disposed in the surrounding wall portion 33 and the pins 22 and 23 are inserted into the main body 31 through an internal hole of the collar portion 32.

The resin 40 is filled between the igniter 20 and the inside of the surrounding wall portion 33 and the inner circumferential surface 32a of the internal hole of the collar portion 32 by injection molding or the like.

The resin 40 is filled between the igniter 20 and the collar 30A, but then shrinks in the arrow direction A of FIG. 10(c) during cooling. Accordingly, as shown in FIG. 10(c), a gap C may be generated between the resin 40 and the inner circumferential surface of the surrounding wall portion 33 and the inner circumferential surface 32a of the collar portion 32. This gap C may function as a passage for leaking gas at the time of operation of the inflator.

Japanese Unexamined Patent Application Publication No. 2004-293835 discloses a construction in which a cylindrical protrusion is provided on a collar such that a gap extended from the inner circumferential surface of the collar to the outer surface of an igniter is not generated although resin is shrunk. However, in this case, the cost of producing the collar increases by forming the protrusion.

An object of the present invention therefore is to provide an igniter assembly which can prevent a gap from being generated due to shrinkage of resin, and which has an easily manufactured collar. Another object of the invention is to provide an inflator using the igniter assembly, and an airbag device and a seat belt device including the inflator.

Further objects and advantages of the invention will be apparent from the following description of the invention and the associated drawings.

SUMMARY OF THE INVENTION

According to an embodiment of the invention, an igniter assembly includes an igniter and a substantially cylindrical collar for holding the igniter, in which the igniter and the collar are integrally joined to each other with resin interposed therebetween. A radial surface which substantially extends in a radial direction is provided in the collar, the resin is attached to the radial surface, and a concave portion is formed in the radial surface.

According to another aspect of the invention, a groove which extends in a non-radial direction is formed as the concave portion.

According to another aspect of the invention, the bottom of the groove is rounded.

According to another embodiment of the invention, an inflator includes the above-described igniter assembly.

According to still another embodiment of the invention, an airbag device includes the above-described inflator.

In another embodiment of the invention, a seat belt device includes a seat belt and a pretensioner which applies pretension to the seat belt by gas pressure from the above-described inflator during an emergency.

In the igniter assembly according to the present invention, the concave portion is provided in the radial surface, shrinkage of the resin is restricted, and a gap is prevented from being generated between the collar and the resin. Furthermore, the concave portion can be more easily formed compared with a protrusion, and the cost of producing the igniter assembly is reduced.

If the groove which extends in a non-radial direction is provided as the concave portion, shrinkage of the resin can be restricted. In addition, the groove can be easily formed in the collar.

If the bottom of the groove is rounded, the resin is easily attached to the bottom of the groove.

The inflator, the airbag device, and the seat belt device including the igniter assembly can prevent gas from leaking through the gap of the igniter assembly upon operation.

DETAILED DESCRIPTION OF THE PREFERRED EMBODIMENTS

Figure 1A:
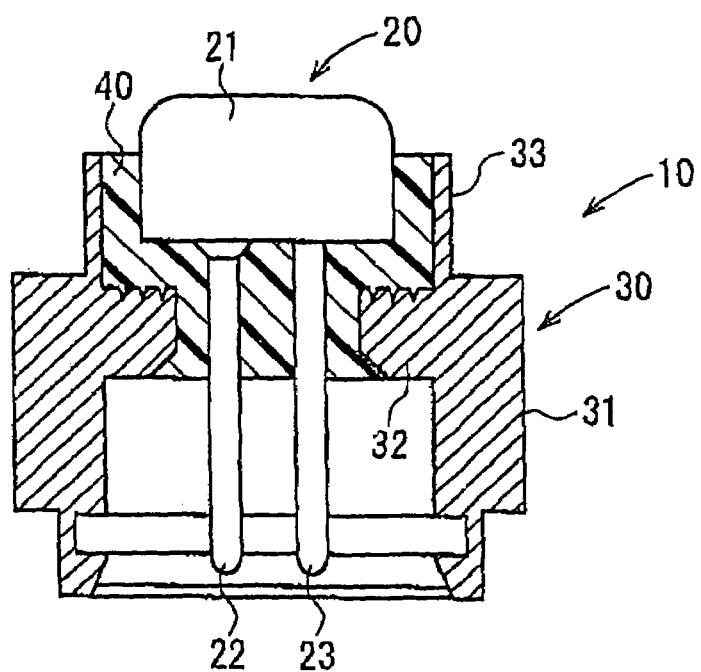
FIG. 1(a) is a cross-sectional view taken along the axial direction of an igniter assembly according to an embodiment of the invention.
Figure 1B:
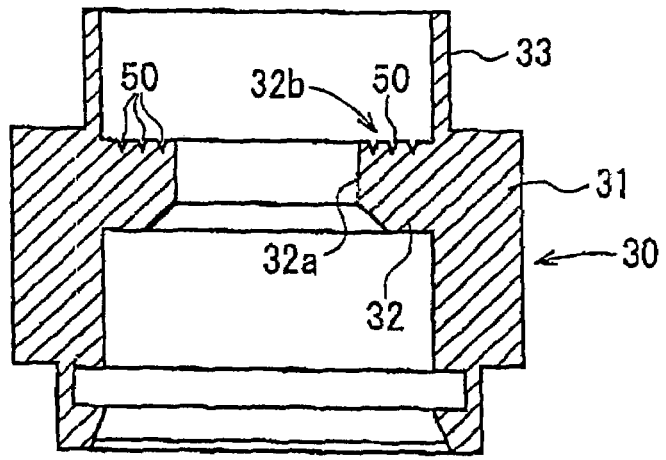
FIG. 1(b) is a cross-sectional view taken along the axial direction of a collar.
Figure 1C:
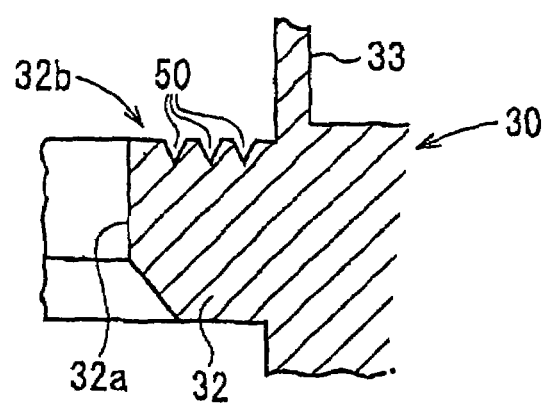
FIG. 1(c) is a partial enlarged cross-sectional view of the collar.
Figure 2A:
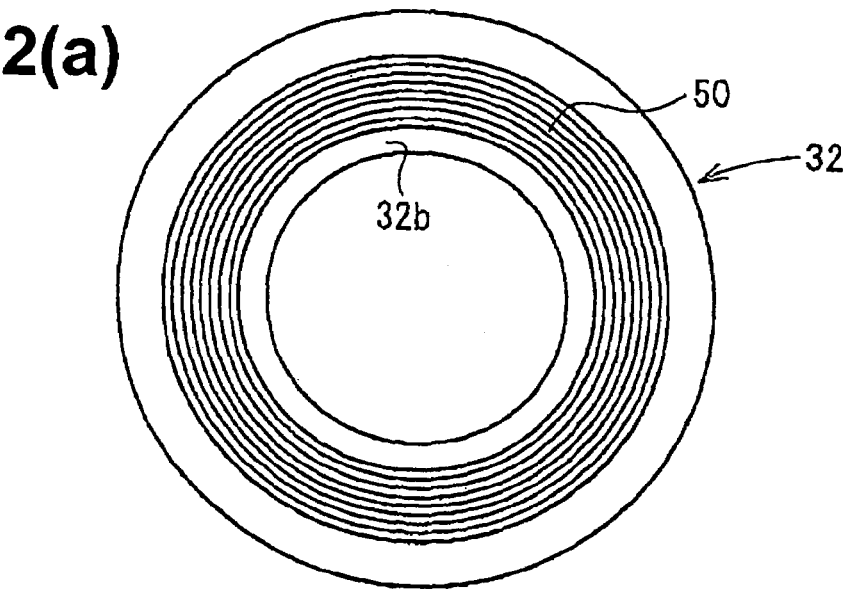
FIGS. 2(a) and 2(b) are plan views of a collar portion.
Figure 2B:
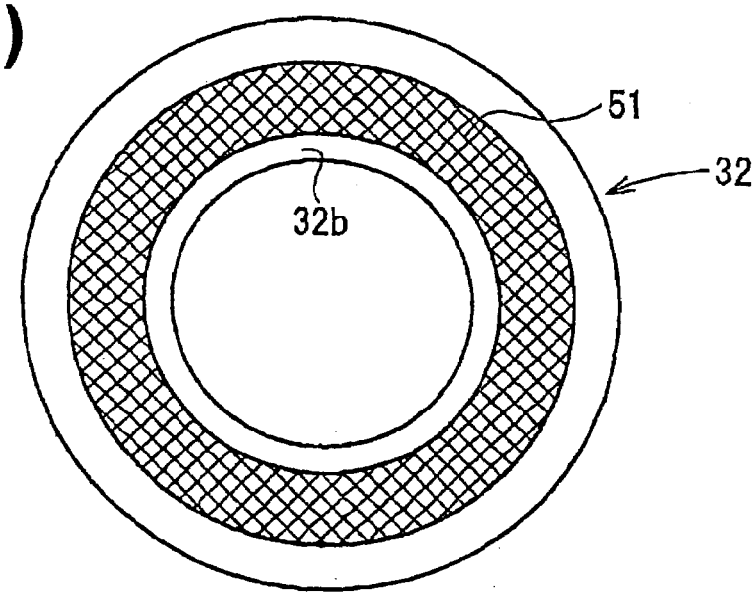
Figure 3:
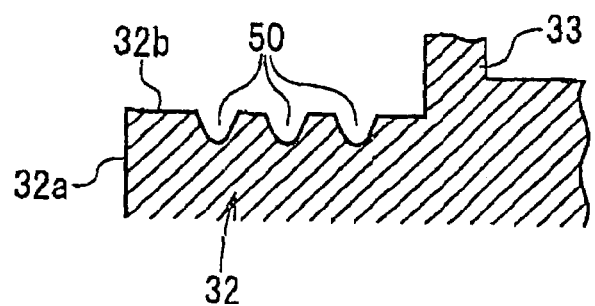
FIG. 3 is a partial enlarged cross-sectional view of the collar portion illustrating a cross-sectional shape of a groove.

Hereinafter, embodiments will be described with reference to the attached drawings. FIG. 1(a) is a cross-sectional view taken along the axial direction of an igniter assembly according to an embodiment, FIG. 1(b) is a cross-sectional view taken along the axial direction of a collar, and FIG. 1(c) is a partial enlarged cross-sectional view of the collar. FIGS. 2(a) and 2(b) are plan views of a collar portion. FIG. 3 is a partial enlarged cross-sectional view of the collar portion illustrating the cross-sectional shape of a groove.

In the igniter assembly 10 according to the present embodiment, grooves 50 are formed in the upper surface 32b of a collar portion 32 of a collar 30 (radial surface at the side of a surrounding wall portion 33). These grooves 50 do not extend in a radial direction and are concentrically formed as shown in FIG. 2(a) in the present embodiment. However, in another possible embodiment, grooves 51 may be formed in a knurling shape, as shown in FIG. 2(b). The depth of the grooves 50 or 51 is preferably 0.2 to 1.0 mm, and particularly, 0.3 to 0.6 mm. The width of the grooves 50 and 51 along the radial surface 32b is preferably 0.3 to 0.8 mm, and particularly, 0.4 to 0.6 mm.

The bottom of the groove 50 is preferably rounded as shown in FIG. 3. The radius of curvature of the rounding is preferably in the order of 0.02 to 0.06 mm. By rounding the bottom of the groove 50, it is possible to prevent with certainty air from remaining in the bottom of the groove when resin is filled in the groove 50.

Figure 4:
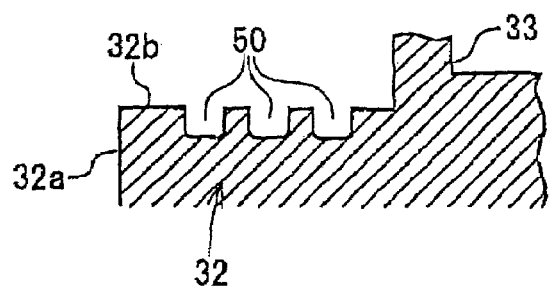
FIG. 4 is a partial enlarged cross-sectional view of the collar portion illustrating another cross-sectional shape of the groove.

However, the shape of the groove 50 is not necessarily limited to this. For example, the bottom of the groove 50 may be flat as shown in FIG. 4.

The other constructions of the igniter assembly 10 according to the present embodiment are the same as the igniter assembly 10A, and like reference numbers denote the like portions.

In the igniter assembly 10, in a case where resin 40 is filled between an igniter 20 and the collar 30, shrinkage of the resin 40 along the radial surface 32b is restricted by the grooves 50 formed in the radial surface 32b of the collar portion 32, and a gap C is prevented from being generated between the resin 40 and the collar 30. Thus, when an inflator including the igniter assembly 10 generates gas, it is possible to prevent the gas from leaking through the gap C.

Furthermore, since the gap C does not exist, it is possible to prevent moisture from permeating into the inflator.

The collar may be made of metal such as aluminum, iron, stainless, or zinc or resin such as nylon or polybutyleneterephthalate (PBT). The groove may be formed by cutting the radial surface 32b of the collar portion 32. Alternatively, the groove may be formed by forming a convex protrusion in a mold when manufacturing the collar by casting or injection molding or the like. If the metal collar is forged, the groove may be formed upon forging.

Next, an inflator including the igniter assembly 10 and an airbag device and a seat belt device including the inflator will be described with reference to FIGS. 5 through 9.

Figure 5:
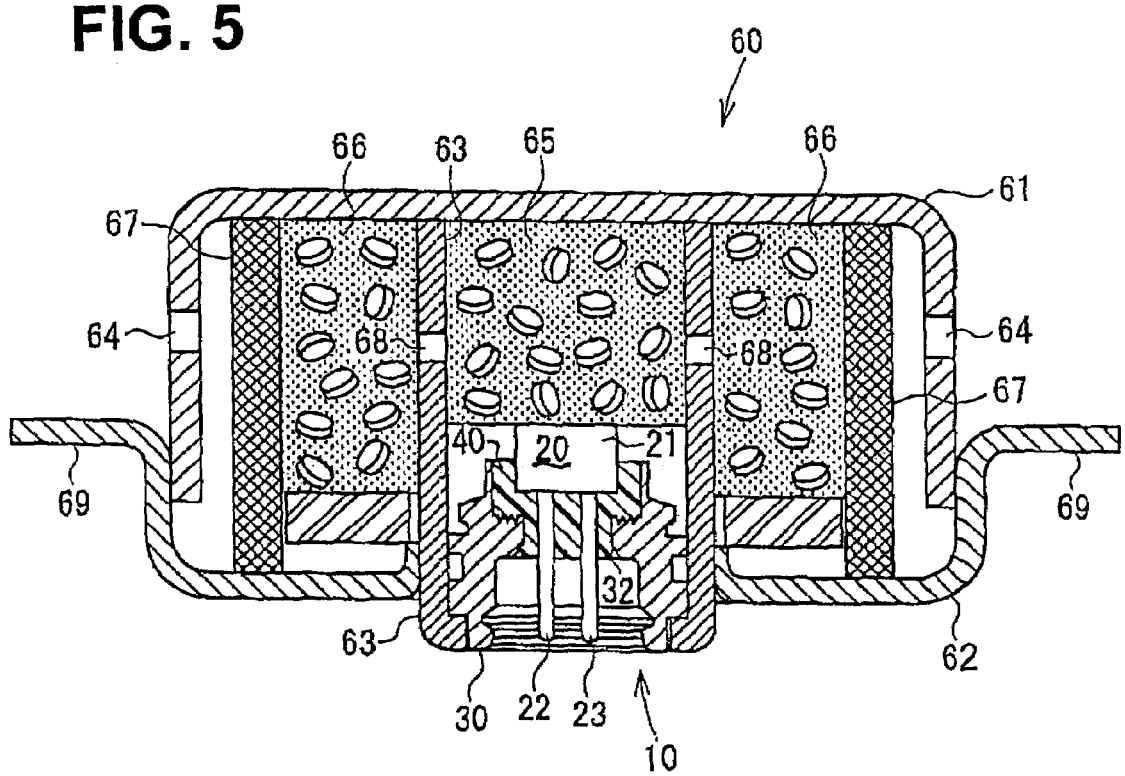
FIG. 5 is a longitudinal cross-sectional view of an inflator for an airbag device including the igniter assembly according to an embodiment of the invention.
Figure 6:
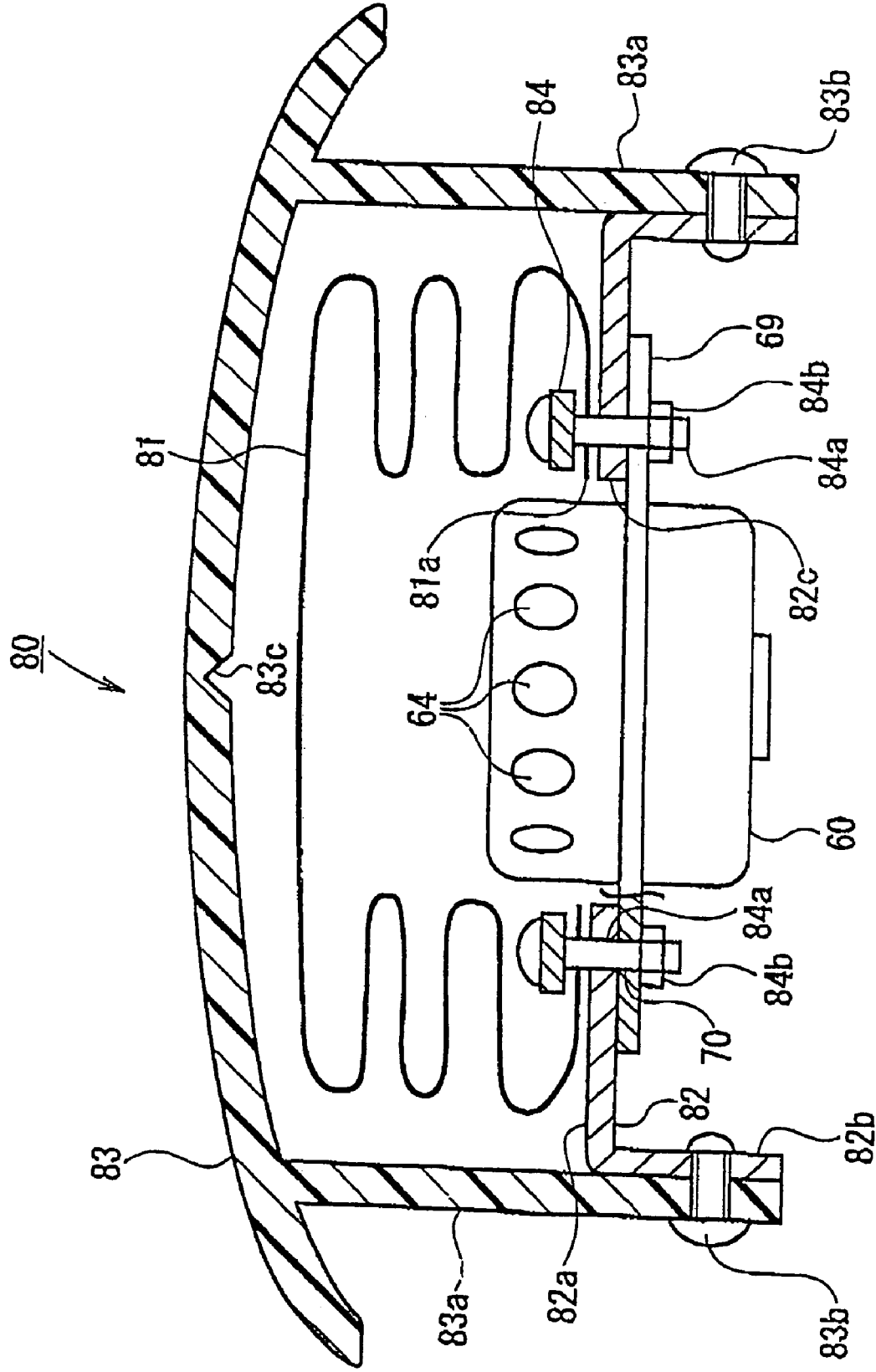
FIG. 6 is a longitudinal cross-sectional view of an airbag device including the inflator shown in FIG. 5.

FIG. 5 is a longitudinal cross-sectional view of an inflator for an airbag device according to the embodiment, and FIG. 6 is a longitudinal cross-sectional view of an airbag device including the inflator.

The inflator 60 for the airbag device includes an outer covering body composed of an upper housing 61 and a lower housing 62 and a cylindrical partition member 63 disposed in the outer covering body. A gas nozzle 64 is provided in the side surface of the outer covering body. One end of the partition member 63 is protruded downward through an opening formed in the bottom of the lower housing 62. The outer circumferential surface of the partition member 63 and the inner circumferential surface of the opening are welded by laser beam welding or the like.

Ignition propellant (booster propellant) 65 is contained in the inside of the partition member 63, and gas generating propellant (main propellant) 66 is contained in the outside of the partition member 63. A filter 67 is disposed in the periphery of the gas generating propellant 66 (between the gas generating propellant 66 and the gas nozzle 64). The inside and the outside of the partition member 63 are communicated with each other through an opening 68.

The igniter assembly 10 is mounted at one end of the partition member 63. In more detail, the igniter assembly 10 is inserted into the partition member 63 while keeping the igniter 20 in the forefront and a head portion 21 of the igniter 20 contacts or faces the ignition propellant 65 in the partition member 63. The periphery of one end side of the partition member 63 is caulked to the inside of the partition member 63 to overlap with the rear periphery of the igniter assembly 10 (collar 30) such that the igniter assembly 10 is held therein and one end of the partition member 63 is sealed.

However, the construction for holding the igniter assembly 10 and sealing the partition member 63 is not limited to this.

In the present embodiment, a flange 69 for mounting the inflator 60 to a retainer 82 is mounted at the side surface of the outer covering body of the inflator 60. The gas nozzle 64 is disposed in the front of the flange 69. Furthermore, in the present embodiment, the flange 69 is integrally formed with the lower housing 62 to be laterally protruded from the upper periphery of the lower housing 62, and the gas nozzle 64 is formed by perforating the side surface of the upper housing 61. However, the present embodiment is not limited to this. A hole 70 into which a bolt 84a is inserted is formed in the flange 69.

The airbag device 80 includes the inflator 60, an airbag 81 which expands by gas emitted from the inflator 60, and the retainer 82 for holding the inflator 60 and the airbag 81, and a module cover 83 mounted on the retainer 82 to cover the folded airbag 81.

The airbag 81 has a front surface facing a vehicle occupant or the like when the airbag 81 expands and a rear surface opposite to the front surface. An opening (mouth) 81a into which the inflator 60 is inserted is provided in the rear surface.

The retainer 82 includes a main plate portion 82a and a leg portion 82b bent downward from the periphery of the main plate portion 82a. An inflator inserting hole 82c is formed in the center of the main plate portion 82a. As shown in FIG. 6, the front side of the inflator 60 is inserted from the rear surface of the main plate portion 82a into the inflator inserting hole 82c. The mouth 81a of the airbag 81 and the periphery of the inflator inserting hole 82c overlap with and are fixed to each other by a mounting ring 84. The front side of the inflator 60 is disposed in the airbag 81 through the mouth 81*a*.

The bolt (stud bolt) 84*a* is protruded from the mounting ring 84 and is inserted into insertion holes (of which the reference numbers are omitted) of the periphery of the mouth 81*a* and the periphery of the inflator inserting hole 82*c* and an insertion hole 70 of the flange 69 to be protruded from the rear surface of the flange 69. By tightening a nut 84*b* to the, bolt 84*a*, the airbag 81 and the inflator 60 are fixed to the retainer 82.

The airbag device 80 is constructed by folding the airbag 81 and mounting the module cover 83 to cover the folded airbag 81.

Moreover, in the present embodiment, a leg member 83*a* is standing downward from the rear surface of the module cover 83 and fixed to the leg portion 82*b* of the retainer 82 by a fixing tool 83*b* such as a rivet. The module cover 83 is pushed and cleaved by the airbag 81 when the airbag expands. Reference number 83*c* denotes a tear line for cleavage.

In the inflator 60 and the airbag device 80 having the aforementioned constructions, when pins 22 and 23 of the igniter assembly 10 are energized, a reaction agent in the igniter 20 reacts and thus the ignition propellant 65 is ignited. Next, the gas generating propellant 66 is ignited by high-temperature gas emitted from the ignition propellant 65 through the opening 68, thereby generating gas. This gas is emitted from the gas nozzle 64 to the outside of the inflator 60, that is, the inside of the airbag 81 through the filter 67. As a result, the airbag 81 expands. The airbag 81 pushes and opens the module cover 83 and expands toward the vehicle occupant or the like, thereby protecting the vehicle occupant or the like.

In the inflator 60 and the airbag device 80, the gas is prevented from leaking between the resin 40 and the collar 30 of the igniter assembly 10 upon operation.

Figure 7:
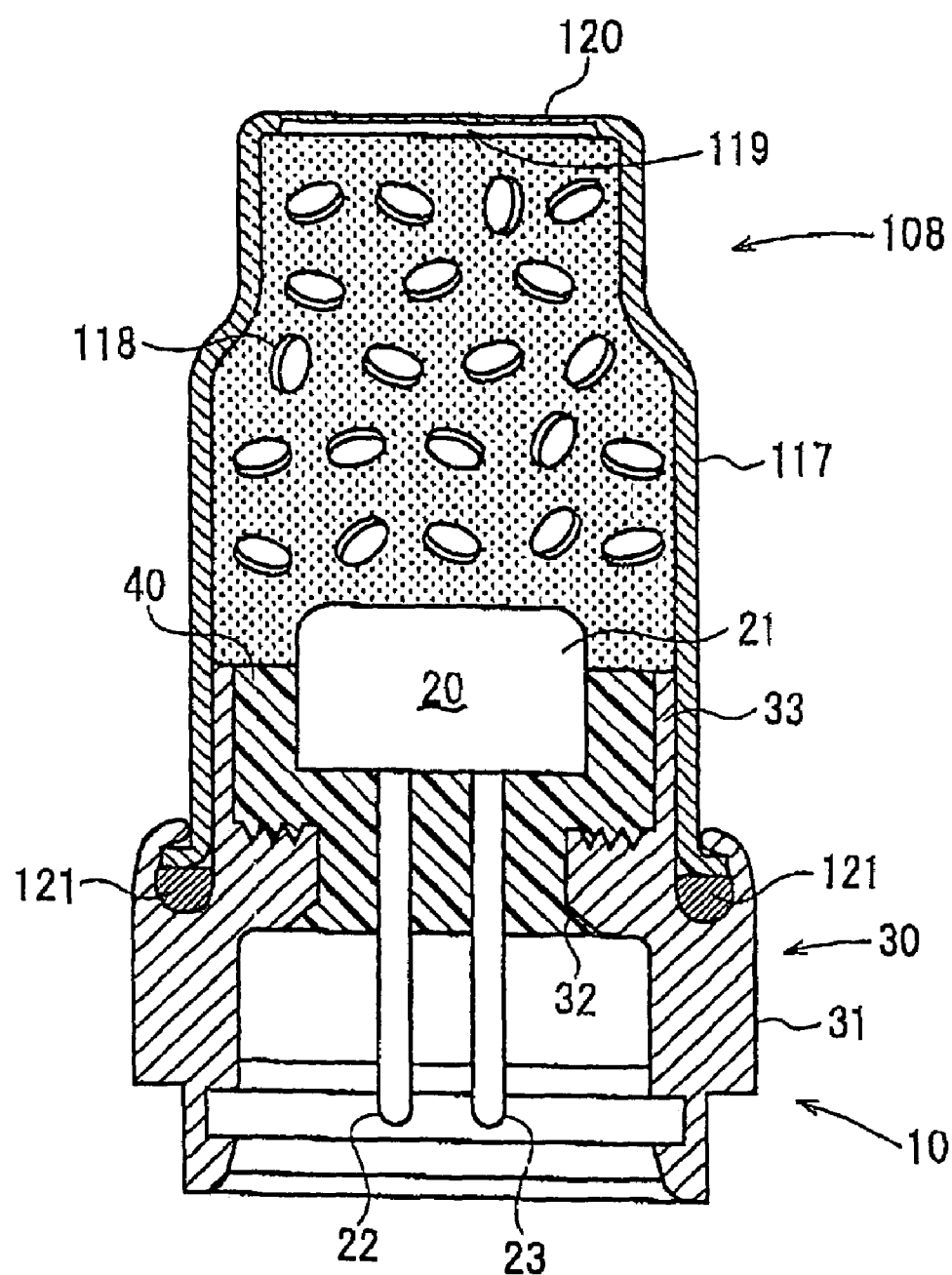
FIG. 7 is a longitudinal cross-sectional view of an inflator for a seat belt device including the igniter assembly according to an embodiment of the invention.
Figure 8:
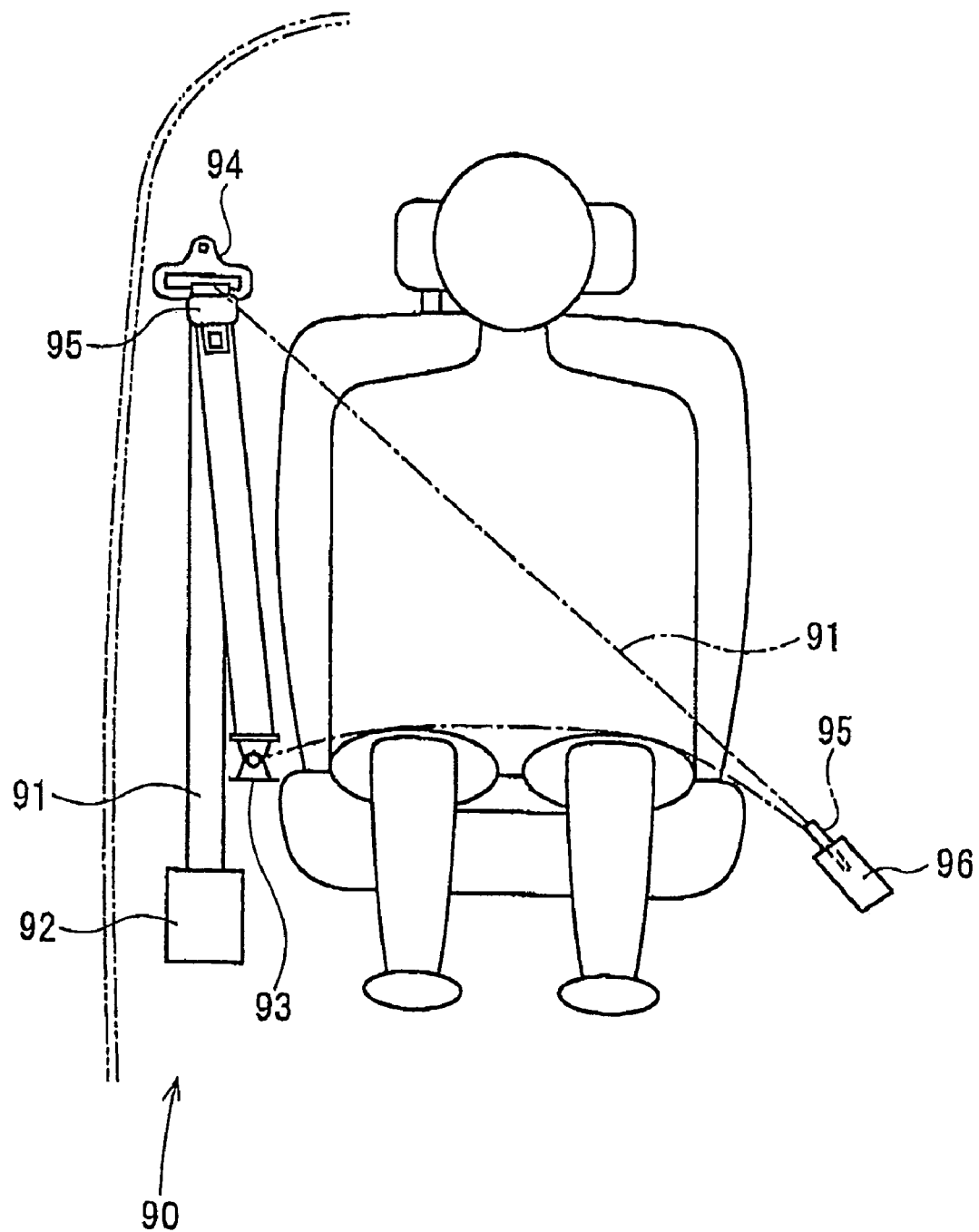
FIG. 8 illustrates the entire construction of a seat belt device that includes the inflator shown in FIG. 7.
Figure 9:
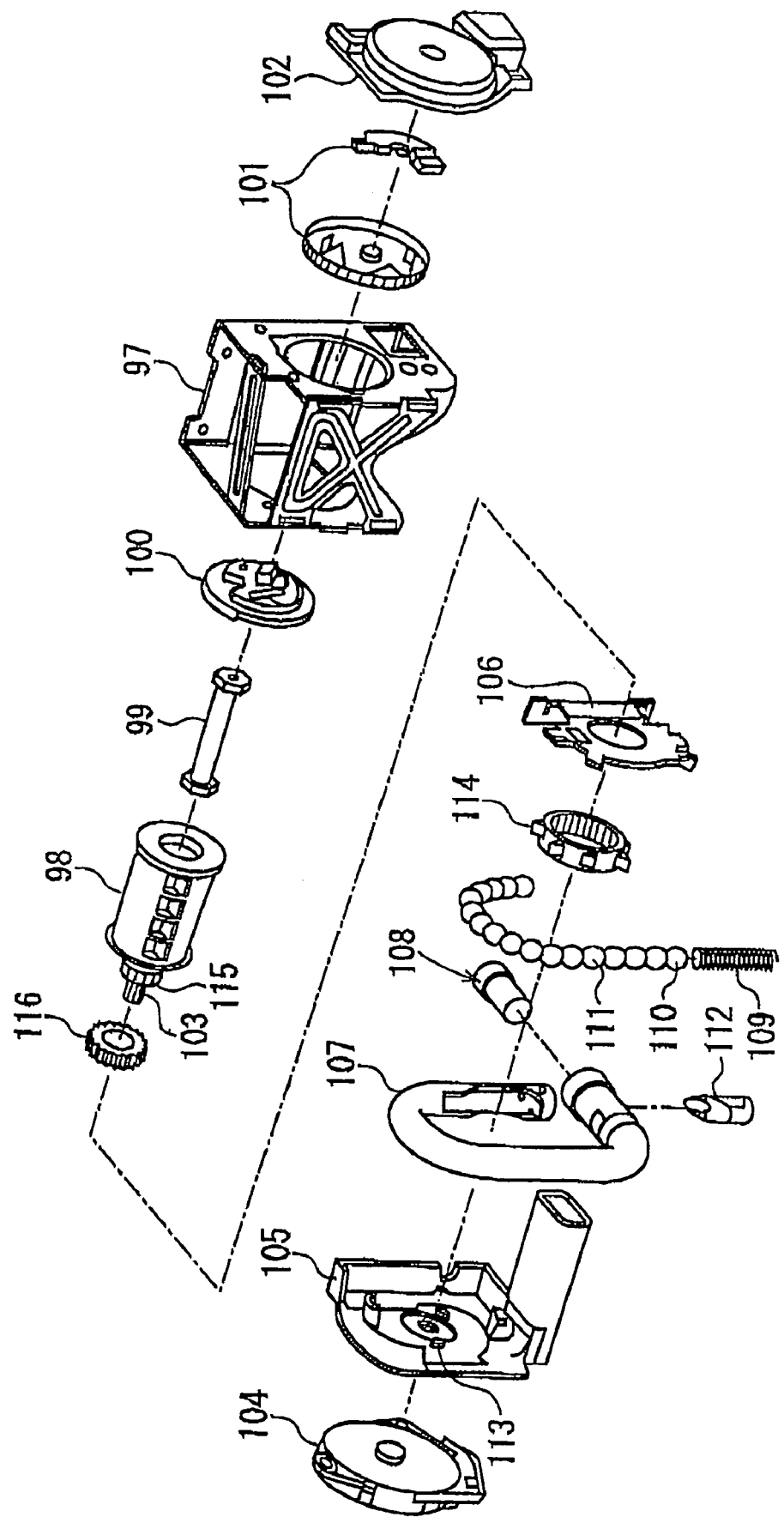
FIG. 9 is an exploded perspective view of a retractor of the seat belt device shown in FIG. 8.
Figure 10A:
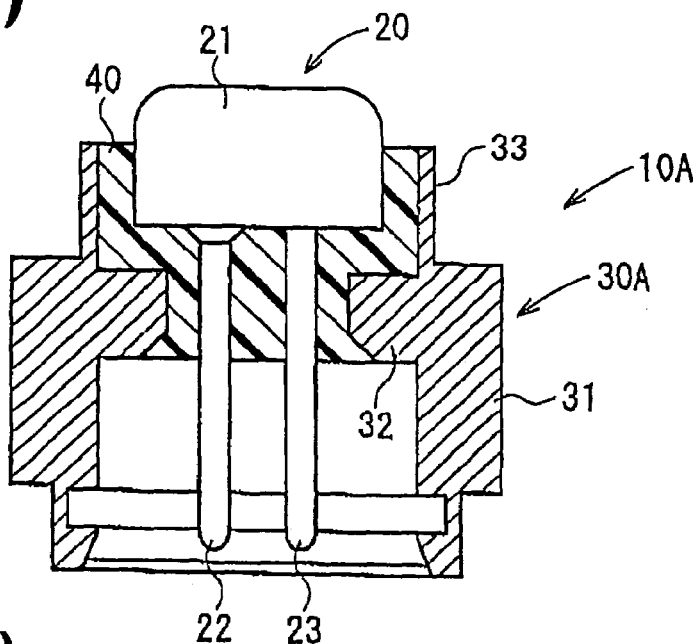
FIG. 10(a) is a cross-sectional view taken along the axial direction of a conventional igniter assembly.
Figure 10B:
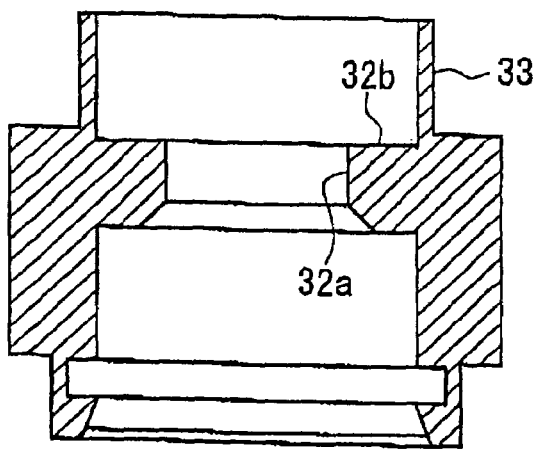
FIG. 10(b) is a cross-sectional view taken along the axial direction of a collar.
Figure 10C:
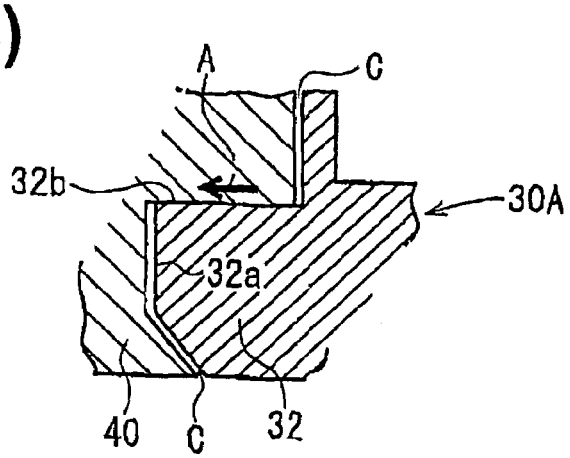
FIG. 10(c) is an enlarged cross-sectional view of the interface between the collar and a resin.

FIG. 7 is a longitudinal cross-sectional view of an inflator for a seat belt device including the igniter assembly 10, FIG. 8 illustrates the entire construction of a seat belt device that includes the inflator, and FIG. 9 is an exploded perspective view of a retractor (pretensioner) of the seat belt device.

One end of a seat belt 91 of the seat belt device 90 is retractably connected to the retractor 92 and the other end thereof is fixed to a vehicle body by an anchor 93. The seat belt 91 penetrates through a shoulder anchor 94 and a tongue 95. The anchor 93 is disposed at the side surface of the vehicle interior. A buckle device 96 for latching the tongue 95 is provided at the opposite side of the anchor 93 of the seat. The shoulder anchor 94 is disposed on the upper side of the side surface of the vehicle interior.

In the present embodiment, the retractor 92 includes a pretensioner which applies pretension to the seat belt 91 during an emergency of the vehicle and an impact energy absorbing mechanism (EA mechanism) for absorbing impact energy applied from the seat belt 91 to the vehicle occupant. Hereinafter, the construction of the retractor 92 will be described with reference to FIG. 9.

A spool 98 is received in a base frame 97 of the retractor 92 and one end of the seat belt 91 is wound on the spool 98. The seat belt 91 is wound on/off by rotating the spool 98. A torsion bar 99 is mounted at the center of axis of the spool 98 and one end of the torsion bar 99 is supported by a support member 102 through locking components 100 and 101.

The torsion bar 99 is a main component of the EA mechanism. If the tension of the seat belt 91 exceeds a predetermined value, the torsion bar 99 is plastic-deformed and thus rotates in an unwinding direction of the seat belt 91 while drag is applied to the spool 98.

A gear 103 is mounted at one end (left side of FIG. 9) of the spool 98. The gear 103 is engaged with a gear (not shown) of a return spring cover 104 shown in lower left side of FIG. 9. The spool 98 is biased in a direction of retracting the seat belt 91 by a return spring (not shown) in the return spring cover 104.

In FIG. 9, a pipe 107 is mounted between a pretensioner cover 105 shown at the right side of the return spring cover 104 and a pretensioner plate 106 shown at the lower right side. An inflator 108 is mounted at one end of the pipe 107. In the pipe 107, a spring 109, a piston 110, and a plurality of balls 111 are arranged. A notched opening (of which the reference number is omitted) is formed in the vicinity of the other end of the pipe 107. A guide block 112 is fitted into the other end of the pipe 107.

A pin 113 is mounted in the pretensioner cover 105 and holds a ring gear 114 having external teeth and internal teeth. The pipe 107 surrounds the outer circumference of the ring gear 114. Furthermore, the pipe 107 is arranged such that a direction from one end to the other end thereof becomes a direction of retracting the seat belt of the spool 98. The opening faces the outer circumferential surface of the ring gear 114 and the front ball 111 exposed through the opening is engaged with the external teeth of the ring gear 114.

A pinion 116 engaged with the internal teeth of the ring gear 114 is mounted on a root portion 115 of the gear 103. When the ring gear 114 is held by the pin 113, the ring gear 114 is not engaged with the pinion 116.

When the inflator 108 emits the gas, the gas is injected into the pipe 107 and the balls 111 moves to the other end of the pipe 107, that is, in the seat belt retracting direction of the spool 98 by gas pressure. At this time, the front ball 111 presses the ring gear 114 to bend the pin 113. Thus, a state that the pin 113 holds the ring gear 114 is released and the ring gear 114 is engaged with the pinion 116.

As a result, the spool 98 is biased in the seat belt retracting direction by the gas pressure from the inflator 108 through the pinion 116, the ring gear 114, and the ball 111, and the seat belt 91 is wound on the spool 98. Thus, the pretension is applied to the seat belt 91.

In the present embodiment, an inflator 108 includes a substantially cylindrical housing 117 and gas generating propellant 118 is contained in the housing 117. A gas nozzle 119 is formed in one end of the housing 117. The gas nozzle 119 is closed by a burst seam 120 upon non-operation of the inflator. When the gas pressure having a predetermined value or more is applied from the inside of the housing 117, the burst seam 120 bursts and the gas nozzle 119 is opened.

The igniter assembly 10 is mounted in the other end of the housing 117. In more detail, the surrounding wall portion 33 of the collar 30 of the igniter assembly 10 is inserted into the housing 117 while keeping the igniter 20 in the forefront and the head portion 21 of the igniter 20 contacts or faces the gas generating propellant 118 in the housing 117.

In the present embodiment, a concave portion (of which the reference number is omitted) is formed in a step portion between the surrounding wall portion 33 and the main body 31, and the other end of the housing 117 is fitted into the concave portion. By caulking the outer periphery of the concave portion in the axial direction of the inflator, the housing 117 and the collar 30 are integrally coupled. In addition, a sealing material (O-shaped ring) 121 for sealing the coupling portion is provided in the concave portion.

The inflator 108 is inserted into one end of the pipe 107 while keeping the gas nozzle 119 in the forefront and connected with the pipe 107 by a connecting mechanism (not shown).

In the inflator 108 and the seat belt device 90 having the aforementioned construction, when the pins 22 and 23 of the igniter assembly 10 are energized, the reaction agent in the igniter 20 reacts and the gas generating propellant 118 is ignited, thereby generating gas. Furthermore, the burst seam 120 bursts by the gas pressure, the gas nozzle 119 is opened, and the gas is emitted from the gas nozzle 119 into the pipe 107. As a result, the pretensioner mechanism of the retractor 92 operates as described above and thus the pretension is applied to the seat belt 91.

In the inflator 108 and the seat belt device 90, it is possible to prevent the gas from leaking between the resin 40 and the collar 30 of the igniter assembly 10 upon operation.

The aforementioned embodiments are only examples of the present invention, and the present invention may take configurations other than the aforementioned configurations. For example, the collar may be changed to a shape other than the aforementioned shape.

The igniter assembly according to the present invention may be incorporated in various kinds of inflators. In addition, the inflator may be incorporated in various kinds of airbag devices and seat belt devices.

The disclosure of Japanese Patent Application No. 2005-079672 filed on Mar. 18, 2005, is incorporated herein.

What is claimed is:

1. An igniter assembly comprising:
   an igniter,
   a collar for holding the igniter, integrally formed as one unit and having a surrounding wall portion for receiving the igniter therein, and a collar portion with a hole therein, said collar portion being formed at one end of the surrounding wall portion to extend substantially perpendicularly thereto, and having a radial surface facing inside the surrounding wall portion and having a plurality of concave portions extending from the radial surface, and
   resin interposed between the igniter disposed in the surrounding wall portion and the collar, and deposited in the concave portions so that the igniter and the collar are integrally joined to each other without causing lateral substantial shrinkage of the resin.

2. The igniter assembly according to claim 1, wherein the collar has a substantially cylindrical shape.

3. The igniter assembly according to claim 1, wherein the concave portions are grooves extending in a non-radial direction.

4. The igniter assembly according to claim 3, wherein the concave portions comprise a plurality of concentric grooves.

5. The igniter assembly according to claim 3, wherein a bottom of each of the grooves is rounded.

6. The igniter assembly according to claim 3, wherein a bottom of each of the grooves is flat.

7. The igniter assembly according to claim 1, wherein the resin between the integrally joined igniter and collar provides a gas-tight and moisture-tight joint.

8. An inflator comprising the igniter assembly according to claim 1, and a propellant ignited by the igniter.

9. An airbag device comprising the inflator according to claim 8, and an airbag.

10. A seat belt device comprising:
    a seat belt;
    a pretensioner for applying pretension to the seat belt during an emergency; and
    the inflator according to claim 8 for discharging pressurized gas,
    wherein the pretensioner applies the pretension to the seat belt by action of the pressurized gas.

11. The igniter assembly according to claim 1, wherein said collar further includes a cylindrical main body, said surrounding wall portion extending upwardly from an upper end of the main body and said collar portion extending radially inwardly from an upper portion of the main body.

* * * * *